United States Patent
Blackmon et al.

(10) Patent No.: US 6,222,155 B1
(45) Date of Patent: Apr. 24, 2001

(54) CUTTING APPARATUS WITH THERMAL AND NONTHERMAL CUTTERS, AND ASSOCIATED METHODS

(75) Inventors: Joseph B. Blackmon, Darlington, SC (US); James L. Segroves, Garland, TX (US)

(73) Assignee: The Esab Group, Inc., Florence, SC (US)

( * ) Notice: Subject to any disclaimer, the term of this patent is extended or adjusted under 35 U.S.C. 154(b) by 4 days.

(21) Appl. No.: 09/593,548

(22) Filed: Jun. 14, 2000

(51) Int. Cl.[7] .................................................. B23K 10/00
(52) U.S. Cl. ............................. 219/121.39; 219/121.44; 219/121.48; 219/121.58; 219/121.59; 266/67; 266/65
(58) Field of Search ........................ 219/121.39, 121.44, 219/121.58, 121.48, 121.59, 121.67; 266/65, 67

(56) References Cited

U.S. PATENT DOCUMENTS

| | | |
|---|---|---|
| 3,761,675 | 9/1973 | Mason et al. . |
| 3,950,189 | 4/1976 | Lange et al. . |
| 4,092,889 * | 6/1978 | Fisher .................................... 83/177 |
| 4,204,448 * | 5/1980 | Pearl ..................... 83/177 |
| 4,466,069 | 8/1984 | Balfanz . |
| 4,551,810 | 11/1985 | Levine . |
| 4,554,635 | 11/1985 | Levine . |
| 4,689,467 | 8/1987 | Inoue . |
| 4,740,668 | 4/1988 | Perez . |
| 4,847,778 | 7/1989 | Daley . |
| 4,940,879 | 7/1990 | De-Swaan . |
| 4,973,819 | 11/1990 | Thatcher . |
| 4,988,845 | 1/1991 | Bauer et al. . |
| 5,006,687 * | 4/1991 | Fujita et al. ..................... 219/121.59 |
| 5,036,176 | 7/1991 | Yamaguchi et al. . |
| 5,043,554 | 8/1991 | Kohsaka et al. . |
| 5,208,440 | 5/1993 | Conley . |
| 5,218,180 | 6/1993 | Fujishima . |
| 5,229,571 | 7/1993 | Neiheisel . |
| 5,262,612 | 11/1993 | Momany et al. . |
| 5,350,897 | 9/1994 | Chun . |
| 5,380,976 | 1/1995 | Couch, Jr. et al. . |
| 5,481,083 | 1/1996 | Smyth, Jr. . |
| 5,560,843 | 10/1996 | Koike et al. . |
| 5,635,086 | 6/1997 | Warren, Jr. et al. . |
| 5,866,872 | 2/1999 | Lu et al. . |
| B1 4,554,635 | 10/1995 | Levine . |

OTHER PUBLICATIONS

ESAB Cutting Systems, Piecemaker 2, Technical Data Sheet, 11/99, 2 pp.

* cited by examiner

Primary Examiner—Mark Paschall
(74) Attorney, Agent, or Firm—Alston & Bird LLP (57) ABSTRACT

A table has a pervious support surface and a gantry is mounted for movement across the support surface in a longitudinal direction. A carriage is mounted to the gantry for movement across the support surface in a transverse direction. Water jet and plasma arc cutting heads are carried by and movable with the carriage. A controller is capable of operating the water jet cutting head while moving the gantry and the carriage to cut a sheet of insulation supported by a first section of the support surface. In addition, the controller is capable of operating the plasma arc cutting head while moving the gantry and the carriage to cut a piece of sheet metal supported by a second section of the support surface. A drainage system is mounted beneath the first section of the support surface for collecting water that falls through the first section of the support surface from the water jet cutting head. A downdraft system is mounted beneath the second section of the support surface for drawing and receiving fumes that are generated by the operation of the plasma arc cutting head.

17 Claims, 4 Drawing Sheets

CUTTING APPARATUS WITH THERMAL AND NONTHERMAL CUTTERS, AND ASSOCIATED METHODS

FIELD OF THE INVENTION

The present invention pertains to an apparatus for cutting workpieces and, more particularly, to an apparatus for cutting sheet metal and sheets of insulation into pieces that are assembled to form ductwork.

BACKGROUND OF THE INVENTION

It is common to cut sheet metal into pieces that are bent or otherwise assembled to form ductwork. A conventional computer numeric controlled (CNC) cutting apparatus for carrying out such cutting includes a horizontal support table for supporting sheet metal to be cut, a longitudinally movable gantry positioned above the table, a transversely movable carriage mounted on the gantry, and a single cutter carried by the carriage. The gantry and carriage are moved while the cutter is operated so that sheet metal is cut according to predetermined patterns. For example, an apparatus of the above-described type is disclosed in U.S. Pat. No. 4,554,635.

It is common for sheets of thermal insulation, such as insulation that is constructed of fiber glass, wood pulp, or the like, to be cut into pieces that are applied to the ductwork that is manufactured as described above. For example, it is conventional for the cutter of an apparatus of the above-described type to be a gas torch, and for the torch to be used to cut both the sheet metal and the insulation. That is, the insulation is cut with a flame from the gas torch. Cutting insulation with the flame of a gas torch can be very disadvantageous because insulation is often flammable, and numerous fumes are released.

It is also conventional to cut the insulation with a cutter that is separate from the cutting apparatus used to cut the sheet metal. As one example, the cutter used to cut the insulation can be a manually operated cutter, such as hand shears. Using a manually operated cutter can be disadvantageously labor intensive, and does not produce repeatable parts. It has also been conventional for the insulation to be cut with a water jet cutter of a CNC cutting apparatus, such that a first CNC cutting apparatus with a torch is used to cut the sheet metal, and a completely separate CNC cutting apparatus with a water jet cutter is used to cut the insulation. Purchasing, operating and maintaining two separate CNC cutting apparatus for cutting sheet metal and insulation can be cost prohibitive. In addition, operating the two separate cutting apparatus can be particularly inefficient when it precludes capitalizing upon similarities between the patterns defining how the sheet metal and insulation are cut.

U.S. Pat. No. 5,635,086 to Warren, Jr. et al. discloses a computer-controlled cutting apparatus having a horizontal support table for supporting metal to be cut, a longitudinally movable gantry positioned above the table, and a transversely movable carriage mounted on the gantry. The carriage has both a laser cutting head and a plasma arc cutting head mounted thereto, but both of the cutting heads are described as being used to cut metal. Although it is disclosed that the gantry could be selectively movable over dual or triple tables which are positioned in tandem, it is not disclosed that the tandem tables can be of different types. Even though the Warren, Jr. et al. patent discloses two different types of cutting heads mounted on the same carriage, there is a teaching away from using both a water-jet cutter and a plasma arc cutter together, because the water from the water-jet cutter could interfere with the operation of a downdraft system associated with the plasma arc cutter. In addition, the Warren, Jr. et al. patent does not disclose that the two cutting heads carried by the same carriage are used to cut completely different types of material.

Accordingly, there is a need for an improved cutting apparatus, such as for cutting sheet metal and insulation, and the like.

SUMMARY OF THE INVENTION

The present invention solves the above and other problems by providing an improved cutting apparatus that is capable of conveniently, efficiently, and safely cutting different types of workpieces. In accordance with one aspect of the present invention, the cutting apparatus includes both a plasma arc cutting head and a water jet cutting head that are contemporaneously carried by a carriage that is carried by a gantry.

In accordance with another aspect of the present invention, the cutting apparatus includes a table for supporting the workpieces and a gantry mounted for back and forth movement across the table in a longitudinal direction. The cutting apparatus further includes a carriage mounted to the gantry for back and forth movement across the table in a transverse direction. In addition, first and second cutting heads are carried by and movable with the carriage. A first supply module is operatively connected to the first cutting head so that the first cutting head is capable of cutting workpieces via a substantially nonthermal cutting process. In contrast, a second supply module is operatively connected to the second cutting head so that the second cutting head is capable of cutting workpieces via a thermal cutting process. The cutting apparatus also includes a controller operative for moving the gantry in the longitudinal direction and operative for moving the carriage in the transverse direction, while either the first cutting head or the second cutting head is operating, so as to cut workpieces positioned on the table.

In accordance with another aspect of the present invention, the first and second cutting heads are a water jet cutting head and a plasma arc cutting head, respectively. Accordingly, the first and second supply modules are a water supply module and a plasma arc supply module, respectively. The water supply module is operatively connected to the water jet cutting head so that the water jet cutting head is capable of operating to cut sheets of insulation. The plasma arc supply module is operatively connected to the plasma arc cutting head so that the plasma arc cutting head is capable of operating to cut sheet metal.

In accordance with another aspect of the present invention, the single cutting apparatus includes both a fume removal system and a drainage system. The fume removal system is for drawing and receiving fumes that are generated while the plasma arc cutting head is operated. The drainage system is for collecting water that is discharged by the water jet cutting head while it is operated.

In accordance with another aspect of the present invention, the fume removal system is a downdraft system, and both the downdraft and drainage systems are positioned below a support surface of the table that supports the workpieces being cut. More specifically, the support surface is pervious, extends generally horizontally, and includes first and second sections. The controller operates the water jet cutting head while moving the gantry and the carriage to cut a sheet of insulation supported by the first section of the support surface. In addition, the controller operates the plasma arc cutting head while moving the gantry and the carriage to cut a piece of sheet metal supported by the second section of the support surface. The drainage system is at least partially positioned beneath the first section of the support surface for collecting water that falls through the first section of the support surface. The downdraft system is at least partially positioned beneath the second section of the support surface for drawing and receiving fumes through the second section of the support surface.

In accordance with another aspect of the present invention, the controller is operative for restricting operation of the water jet cutting head while it is directly above the second section of the support surface. Similarly, the controller is operative for restricting operation of the plasma arc cutting head while it is directly above the first section of the support surface.

Accordingly, the cutting apparatus of the present invention is capable of conveniently, efficiently and safely cutting vastly different types of workpieces, such as sheet metal and sheets of insulation.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
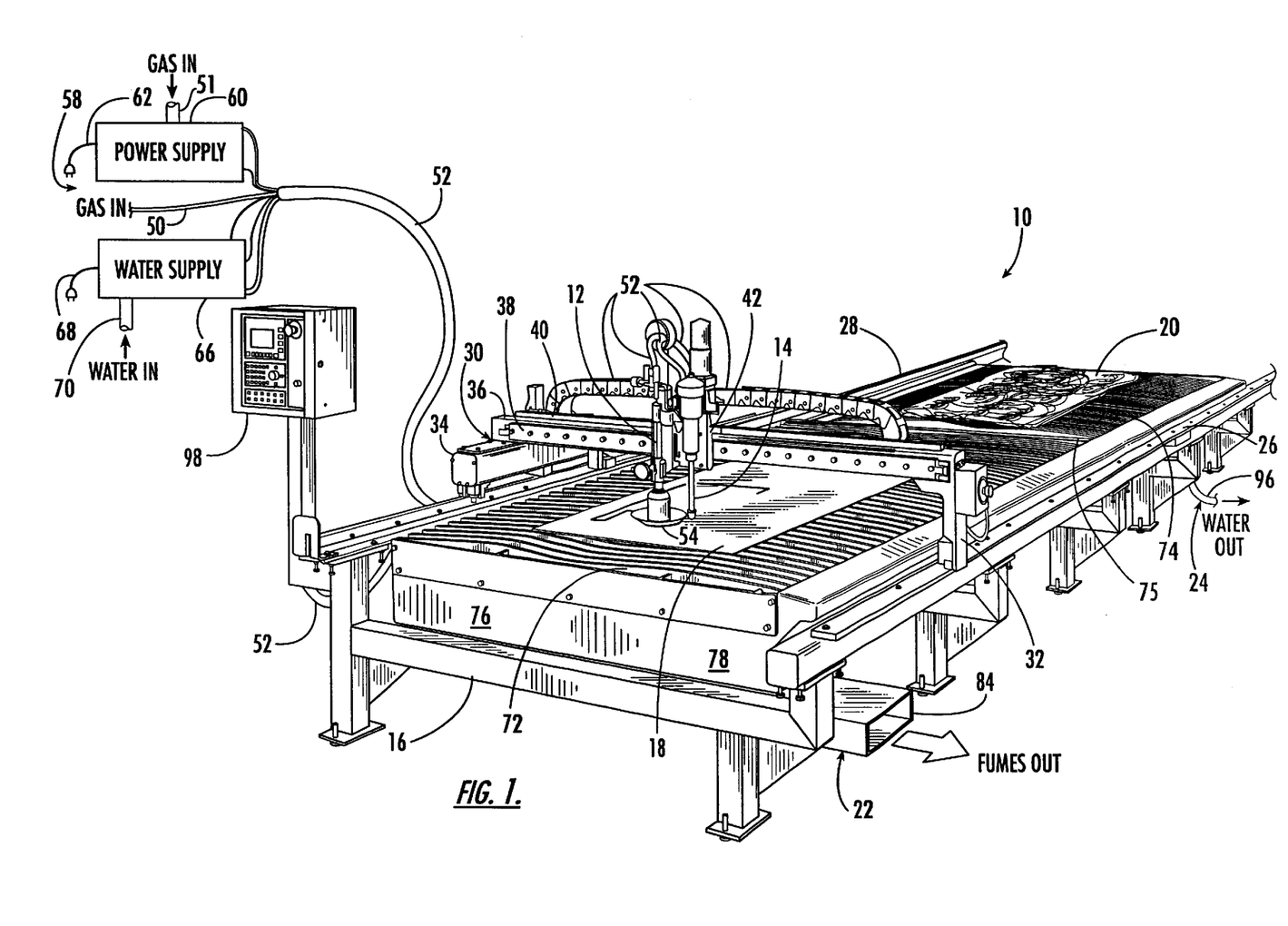
FIG. 1 is a partially schematic, perspective view of portions of a computer numeric controlled cutting apparatus that includes water jet and plasma arc cutting heads mounted side by side, in accordance with an exemplary embodiment of the present invention.

FIG. 1 illustrates a cutting apparatus 10 in accordance with an exemplary embodiment of the present invention. The cutting apparatus 10 will be briefly described, in accordance with the exemplary embodiment, followed by a more detailed description thereof. The cutting apparatus 10 is operative for moving plasma arc and water jet cutting heads 12, 14 together across a longitudinally extending table 16. The plasma arc cutting head 12 can be operated to cut a piece of sheet metal 18 supported on the table 16, and the water jet cutting head 14 can be operated to cut a sheet of insulation 20 on the table. A downdraft system 22 (also see FIGS. 2–4) is mounted beneath a front section of the table 16 and is operative for collecting fumes that are generated while the sheet metal 18 is cut. A drainage system 24 (also see FIGS. 3–4) is mounted beneath a rear section of the table 16 and is operative for collecting water discharged by the water jet cutting head 14 while the insulation 20 is cut.

Regarding the structure of the cutting apparatus 10 more specifically, longitudinally extending right and left rails 26, 28 are laterally displaced from one another and mounted at opposite sides of the table 16. The cutting apparatus further includes a gantry 30 that is carried by the longitudinally extending rails 26, 28 for back and forth movement in the longitudinal direction. The gantry 30 includes a right upright 32 that travels along the right rail 26 via wheels, or the like, and a left upright 34 that travels along the left rail 28 via wheels, or the like. The left upright 34 includes a conventional drive motor assembly for propelling the gantry 30 along the longitudinal rails 26, 28. The gantry 30 further includes a support beam 36 that is carried by and extends transversely between the uprights 32, 34.

A front rail 38 extends transversely across and is mounted to the front face of the support beam 36, and a top rail 40 extends transversely across and is mounted to the top surface of the support beam. The transverse rails 38, 40 carry a carriage 42 via wheels, or the like, for back and forth movement in the lateral direction along the support beam 36. The carriage 42 includes a conventional drive motor assembly for propelling the carriage back and forth along the transverse rails 38, 40.

Figure 2:
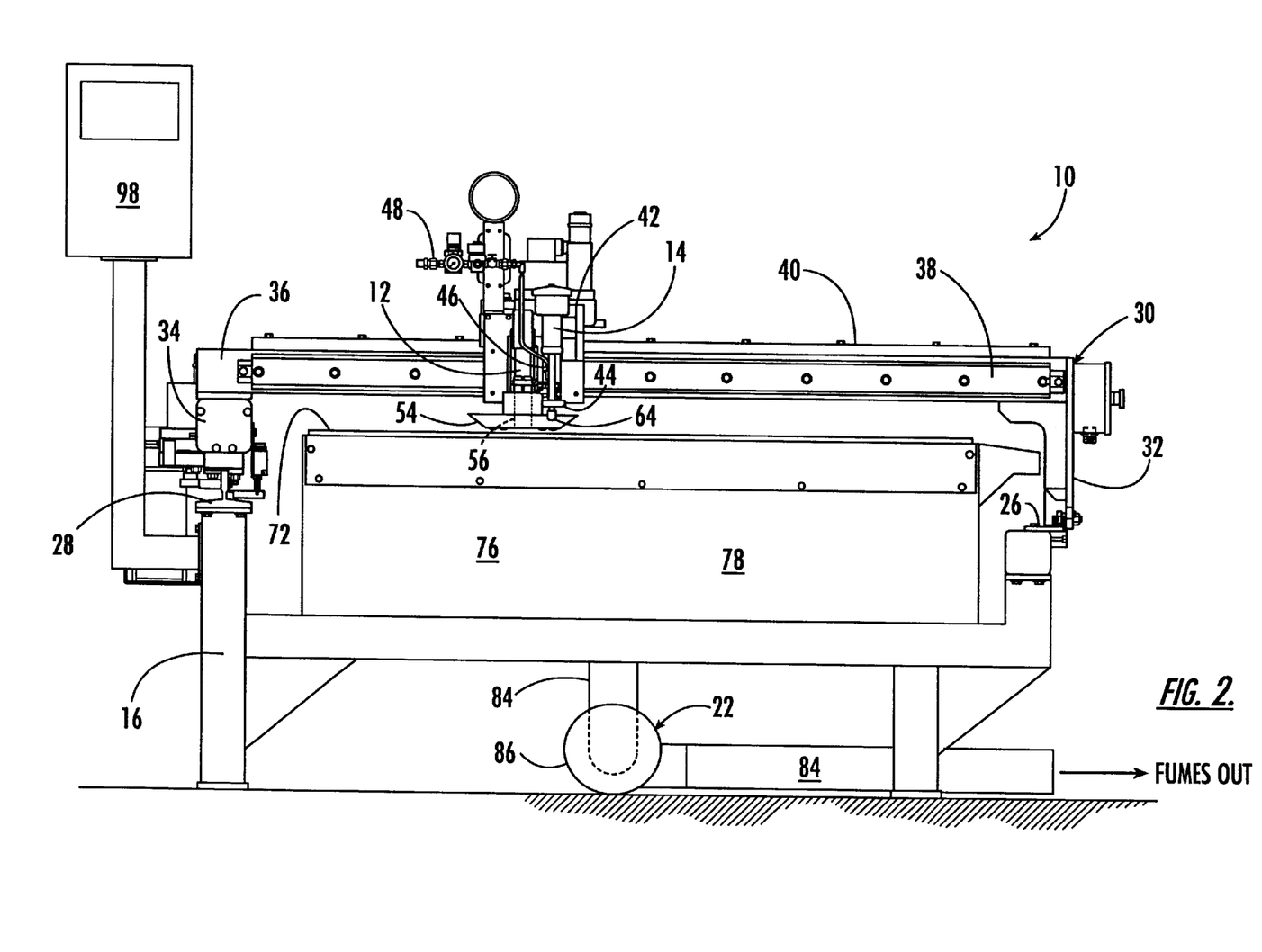
FIG. 2 is a front elevation view of portions of the cutting apparatus of FIG. 1.

Referring to FIG. 2, in accordance with the exemplary embodiment, the carriage 42 includes an elevator assembly (e.g., slide assembly) having an elevator body 44 (e.g., slide body) that is mounted to the carriage for up and down movement relative to the table 16. The elevator assembly also includes a pneumatic actuator 46 that is mounted between the carriage 42 and the elevator body 44. The elevator assembly is not shown in FIG. 1. The pneumatic actuator 46 receives compressed air via an actuator supply line 48 in a controlled manner that allows the pneumatic actuator to raise and lower the elevator body 44 relative to the carriage 42 and the table 16. In accordance with the exemplary embodiment, the actuator supply line 48 receives compressed air from a gas supply line 50 (FIG. 1). The supply lines 48, 50 communicate via a conduit incorporated into a communication system 52 (FIG. 1) that includes bundles of conventional communication conduits. In accordance with the exemplary embodiment, the gas supply line 50 receives compressed air from a supply of compressed air (not shown), such as from a conventional system for supplying compressed air to various components in a shop.

The plasma arc cutting head 12 is mounted to and moves with the elevator body 44. The plasma arc cutting head 12 contains an internal electrode (not shown) and further includes a discharge nozzle that is hidden from view in FIGS. 1–2 by an annular shield 54. The shield 54 defines a central opening 56, which is illustrated by broken lines in FIG. 2, that contains the nozzle of the plasma arc cutting head 12 and through which the nozzle can interact with a piece of sheet metal 18 carried by the table 16. The shield 54 functions to keep the piece of sheet metal 18, or splatter therefrom, from coming into contact with the cutting heads 12, 14.

Referring to FIG. 1, the plasma arc cutting head 12 is part of a plasma arc cutting system that further includes a plasma arc supply module 58, which is schematically illustrated. The plasma arc supply module 58 communicates with the plasma arc cutting head 12 via conventional communication conduits of the communication system 52. The plasma arc supply module 58 includes an electric power supply 60, which is equipped with an electrical supply cord 62, and a gas supply line 51. In accordance with the exemplary embodiment, the gas supply line 51 receives compressed air from a supply of compressed air (not shown), such as from a conventional system for supplying compressed air to various components in a shop, or the like. The electric power supply 60 includes a transformer (not shown) and other components that facilitate operation of the plasma arc cutting system, as will be discussed in greater detail below.

Referring to FIG. 2, in accordance with the exemplary embodiment, the water jet cutting head 14 is also mounted to and moves with the elevator body 44. The cutting heads 12, 14 are in close proximity to one another and are most preferably in a side-by-side arrangement. The water jet cutting head 14 includes a discharge nozzle 64 oriented toward the table 16. In accordance with an alternative embodiment of the present invention, the elevator assembly, which includes the elevator body 44, is not included in the cutting apparatus 10 and both of the cutting heads 12, 14 are mounted directly to the carriage 42.

Referring to FIG. 1, the water jet cutting head 14 is part of a water jet cutting system that further includes a water supply module 66, which is schematically illustrated. The water supply module 66 includes an electrical supply cord 68 as well as a water supply line 70. The water supply line 70 can be broadly characterized as a line for providing the cutting medium that is utilized by the water jet cutting system, or the like. The water supply module 66 contains a pump (not shown) and one or more valves (not shown) that are selectively operated to provide a supply of pressurized water to the water jet cutting head 14, as will be discussed in greater detail below. The water supply line 70 is preferably connected to a source of water that provides sufficient head to the pump of the water supply module 66. In accordance with the exemplary embodiment, the water supply line 70 is connected to a tap that supplies water from a municipal water supply, or the like.

The table 16 includes a longitudinally and laterally extending, pervious support surface that supports the workpieces 18, 20 being cut by the cutting apparatus 10. In accordance with the exemplary embodiment, the support surface includes front and rear sections of grating 72, 74. The front section of grating 72 includes one or more pieces of metal grate that are electrically grounded and positioned over the downdraft system 22. The rear section of grating 74 includes one or more pieces of metal grate that are positioned over the drainage system 24. In accordance with the exemplary embodiment, it is important for the grate(s) of the front section of grating 72 to be electrically grounded, whereas it is not necessary for the grate(s) of the rear section of grating 74 to be electrically grounded, as will be discussed in greater detail below. The front and rear sections of grating 72, 74 are preferably at least adjacent so that the useful working surface of the cutting apparatus 10 is advantageously maximized. In accordance with the exemplary embodiment, a small laterally extending space 75 is defined between the sections of grating 72, 74, but the longitudinal rails 26, 28 extend continuously between the opposite ends of the table 16. In accordance with an alternative embodiment of the present invention, the front and rear sections of grating 72, 74 are contiguous.

Referring to FIGS. 1–4, the downdraft system 22 includes a downdraft container 76 mounted to the table 16 beneath the front section of grating 72. The grating 72, 74 is not illustrated in FIG. 4. As best understood with reference to FIG. 4, the downdraft container 76 includes multiple generally upright partitions 78. The upper edges of the upright partitions 78 cooperate to define an inlet opening to the downdraft container 76. The inlet opening is proximate the bottom surface of the front section of grating 72. The lower edges of the upright partitions 78 are connected to the periphery of a generally horizontally extending bottom partition 80. The bottom partition 80 defines an outlet opening 82 to the downdraft container 76. The downdraft system 22 also includes a passage in the form of discharge ductwork 84 that is connected to the outlet opening 82 of the downdraft container 76.

An air moving device 86 (FIGS. 2–3) is positioned between two sections of the discharge ductwork 84 and is operative for creating a vacuum in the downdraft container 76. In accordance with the exemplary embodiment, the air moving device 86 includes a motor (not shown) that drives a squirrel-cage fan (not shown), as should be understood by those of ordinary skill in the art. The downdraft system 22 is operative, while the air moving device 86 is operating, to draw fumes through the front section of grating 72 and into the downdraft container 76 via its inlet opening, and to discharge the fumes from the downdraft container via the outlet opening 82 and the discharge ductwork 84. It is preferred for the discharge ductwork 84 to extend farther away from the table 16 than is illustrated in the figures, such as to an apparatus for filtering the fumes entrained by the downdraft system 22 and venting the filtered gases to the ambient environment. In accordance with an alternative embodiment of the present invention, the discharge ductwork 86 does not include the air moving device 86 as illustrated in FIGS. 2–3, and the discharge ductwork extends to an air moving device and associated air filtration system, or the like, that are distant from the cutting apparatus 10.

Figure 3:
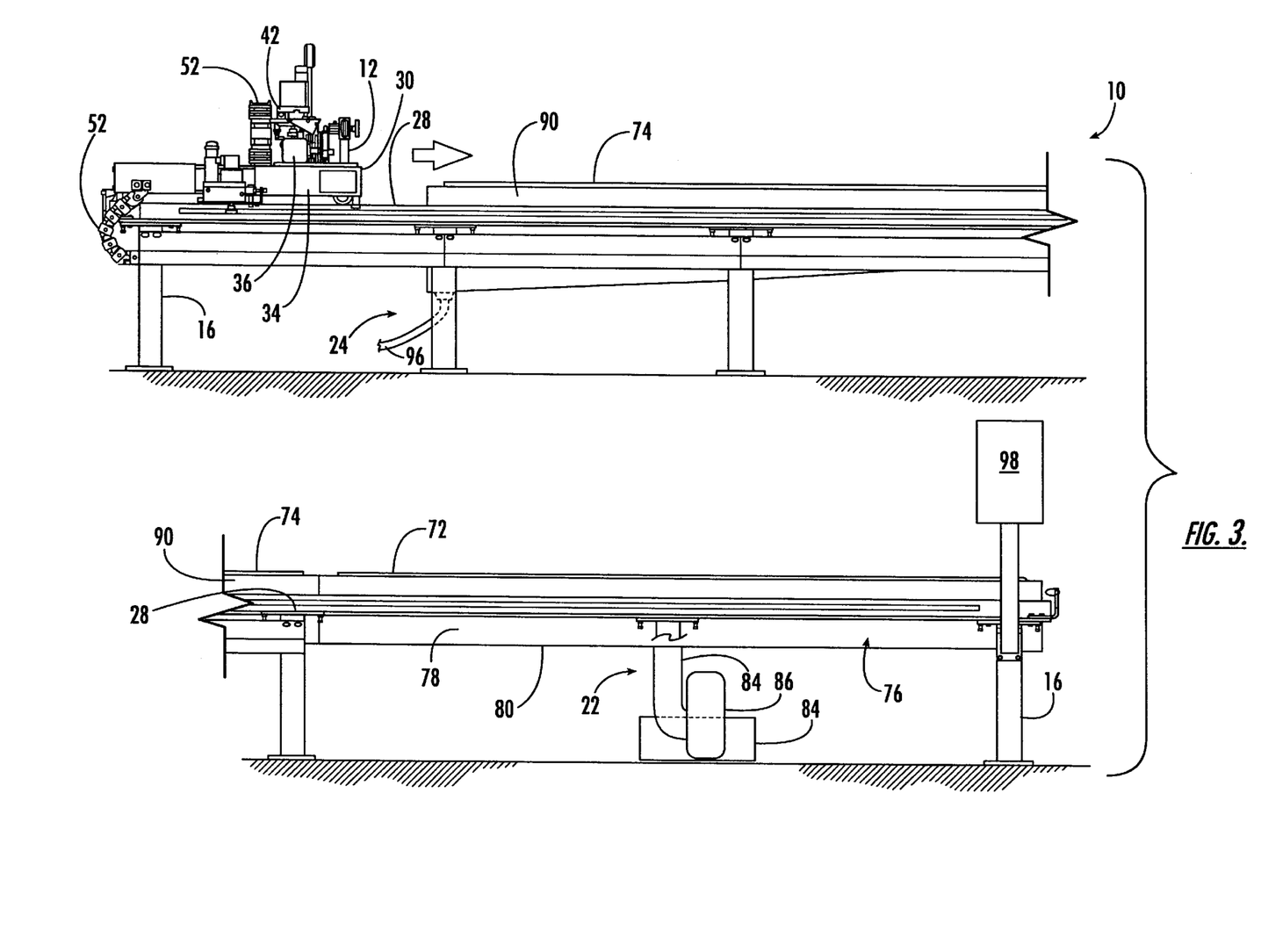
FIG. 3 is a left elevation view of portions of the cutting apparatus of FIG. 1.
Figure 4:
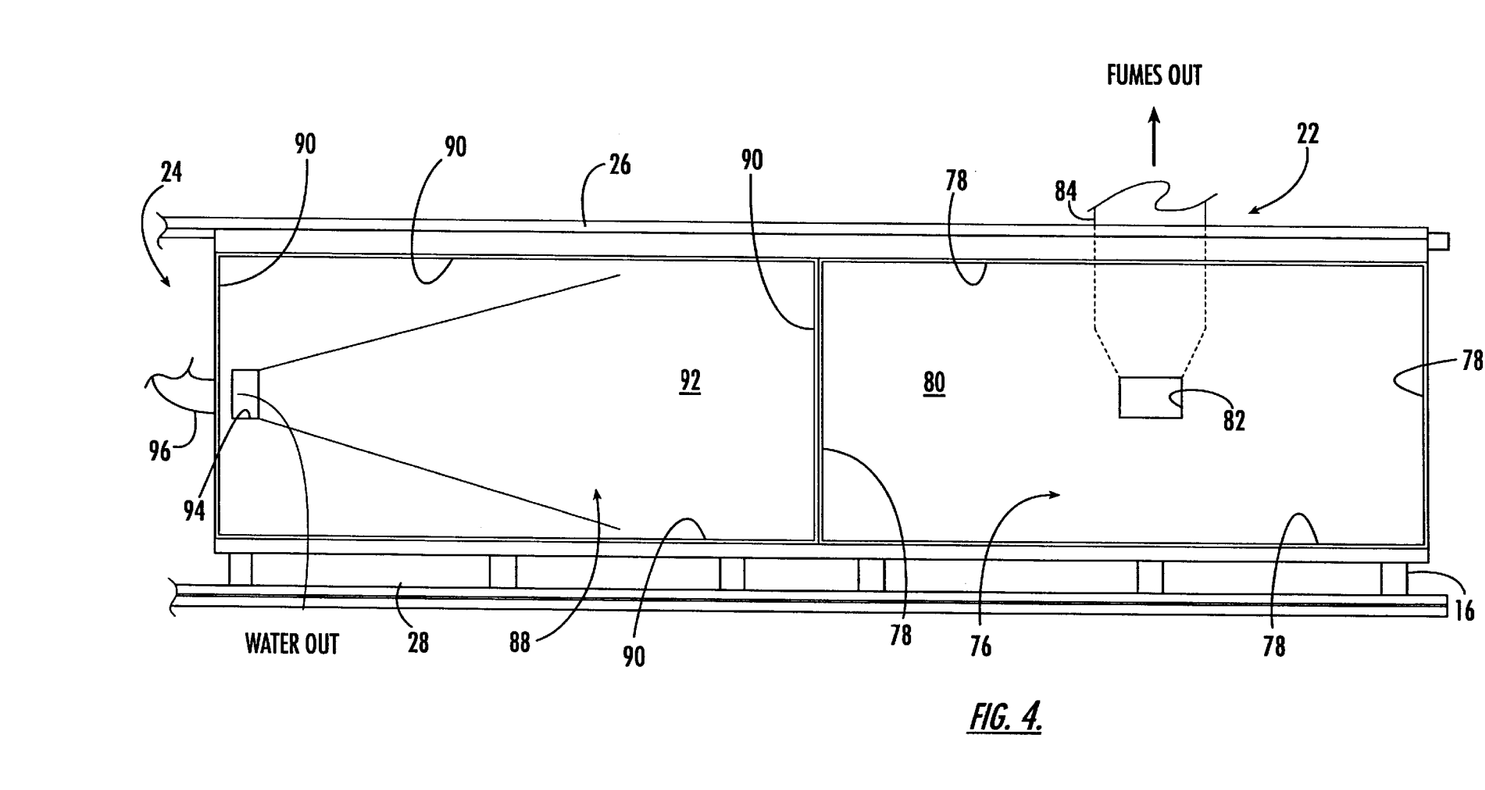
FIG. 4 is a top plan view of portions of the cutting apparatus of FIG. 1, wherein grating of the cutting apparatus is not illustrated so as to better show portions of drainage and downdraft systems of the cutting apparatus.

Referring to FIGS. 3–4, the drainage system 24 includes a drainage container 88 mounted to the table 16 beneath the rear section of grating 74. As best understood with reference to FIG. 4, the drainage container 88 includes multiple upright partitions 90. The upper edges of the upright partitions 90 define an inlet opening to the drainage container 88. The inlet opening of the drainage container 88 is proximate the bottom surface of the rear section of grating 74. The lower edges of the upright partitions 90 are connected to the periphery of a bottom partition 92. The bottom partition 92 slopes toward and defines an outlet opening 94 to the drainage container 88. The drainage system 24 further includes a drainage passage that receives water from the outlet opening 94 of the drainage container 88. For example, in accordance with the exemplary embodiment that passage is a drainage conduit 96 that is connected to the outlet opening 94 of the drainage container 88. Water collected in the drainage container 88 flows into the drainage conduit 96 via the outlet opening 94 and is directed away from the cutting apparatus 10, such as by being directed to a floor drain, or the like.

Referring to FIG. 1, in accordance with the exemplary embodiment, the cutting apparatus 10 further includes a computer numeric controlled (CNC) controller 98, or the like, that is operative for controlling operations of the cutting apparatus by virtue of being controllably connected to each of the gantry 30, carriage 42, pneumatic actuator 46 (FIG. 2) of the elevator assembly, plasma arc cutting system and water jet cutting system via the communication system 52. The controller 98 includes suitable controls, such as a computer processor and associated software modules, or the like, for carrying out the operations of the cutting apparatus 10. Software modules operate in conjunction with the controller 98 for carrying out the herein described operations of the present invention. Some of the operations carried out by the cutting apparatus 10 in response to instructions provided by the controller 98 are described in the following paragraphs, in accordance with the exemplary embodiment.

The carriage 42, and therefor each of the cutting heads 12, 14, can be moved horizontally to any position over the sections of grating 72, 74, and the carriage can be parked proximate either the front or rear end of the table 16. The ability to park the carriage 42 at either end of the table 16 is advantageous because it allows for the workpieces, such as pieces of sheet metal 18 and sheets of insulation 20, to be conveniently manually applied to and removed from the front and rear sections of grating 72, 74 without having to navigate around the gantry 30 and items carried thereby.

As illustrated in FIG. 1, sheet metal 18 is cut upon the front section of grating 72, and sheets of insulation 20 are cut upon the rear section of grating 74. Accordingly, a rack (not shown) that carries uncut pieces of sheet metal 18 can be positioned proximate the front end of the table 16 so that sheet metal can be conveniently supplied from the rack to the front section of grating 72. Likewise, a roll of insulation (not shown) can be carried by a wheeled cart (not shown) positioned proximate the rear end of the table 16 and latched thereto so that sheets of insulation can be conveniently supplied to the rear section of grating 74. In accordance with the exemplary embodiment, the insulation 20 is thermal insulation, such as insulation that is constructed of fiber glass, wood pulp, or the like.

The plasma arc cutting system is operated so that the plasma arc cutting head 12 provides a plasma arc that cuts a piece of sheet metal 18 supported by the front section of grating 72. More specifically, the plasma arc extends from the nozzle of the plasma arc cutting head 12 to the sheet metal 18 carried by the front section of grating 72. The plasma arc is created when gas interacts with an electrical arc that extends between the electrode in the plasma arc cutting head 12 and the sheet metal 72. In accordance with the exemplary embodiment, the gas is air that is supplied from the gas supply line 51 to the plasma arc cutting head 12 via a conduit of the communication system 52. Fumes resulting from the cutting caused by the plasma arc are drawn into the inlet opening of the downdraft container 76 and are routed away from the cutting apparatus 10 by the downdraft system 22. Those fumes can be characterized as residual components of, or residue of, the cutting process, and accordingly the downdraft system 22 can be characterized as a residue collecting system.

The water jet cutting system is operated so that the water jet cutting head 14 provides a stream of water that cuts a sheet of insulation 20 supported on the rear section of grating 74. More specifically, a jet-like coherent stream of water is discharged from the discharge nozzle 64 of the water jet cutting head 14 so that the stream cuts the sheet of insulation 20. The water discharged from the water jet cutting head 14 falls into the inlet opening of the drainage container 88 and is routed away from the cutting apparatus 10 by the drainage system 24. That water can be characterized as a residual component of, or residue of, the cutting process, and accordingly the drainage system 24 can be characterized as a residue collecting system.

In accordance with the exemplary embodiment, pieces of sheet metal 18 and sheets of insulation 20 can be cut in an alternating fashion. As a result, cut pieces of sheet metal 18 can be manually removed from the table 16 and a piece of sheet metal to be cut can be manually applied to the table while a sheet of insulation is being cut, and vice versa. Therefore, the cutting apparatus 10 can be operated to cut workpieces nearly continuously, which is advantageous.

In accordance with the exemplary embodiment, operation of the plasma arc cutting system is restricted while the plasma arc cutting head 12 is directly above the rear section of grating 74. This restriction is advantageous since the rear section of grating 74 is for carrying sheets of insulation 20 and a plasma arc will ignite some types of insulation. Likewise, operation of the water jet cutting system is restricted while the water jet cutting head 14 is directly above the front section of grating 72. This restriction is advantageous since the introduction of water into the downdraft system 22 could damage the downdraft system.

The controller 98 causes the workpieces (e.g., pieces of sheet metal 18 and sheets of insulation 20) carried by the table 16 to be cut according to predetermined patterns. Some of the patterns for the sheets of insulation 20 being cut are at least similar to some of the patters for the sheet metal 18 being cut. Advantageously, the present invention can conveniently capitalize on the similarities between those patterns, since in accordance with the exemplary embodiment the single controller 98 provides the instructions for carrying out the cutting of both the sheet metal 18 and the sheets of insulation 20. For example, both a piece of sheet metal 18 and a sheet of insulation 20 can be cut according the same pattern or according to slight variations of the same pattern, as should be understood by those of ordinary skill in the art in view of this disclosure.

The pneumatic actuator 46 (FIG. 2) of the elevator assembly is operated to adjust the height of the elevator body 44 (FIG. 2) above the table 16, which simultaneously adjusts the heights of the cutting heads 12, 14 above the support surface that is defined by the sections of grating 72, 74. The pneumatic actuator 46 is variably positionable to accommodate for different thicknesses of the workpieces.

In accordance with the exemplary embodiment, the controller 98 is connected to a label printer (not shown) and causes the printer to print self-adhesive labels that are specific to each of the pieces of cut sheet metal 18 and insulation 20. The label for a piece being cut is printed generally while the piece is being cut. The labels are manually affixed at predetermined points on the pieces of cut material (including both the cut pieces of insulation 20 and the cut pieces of sheet metal 18). The labels are specially placed and the cut pieces are specially placed in racks (not shown) having vertically spaced shelves so that the labels are readily visible. The labels provide specific information that facilitates both easy matching with and assembly of the cut pieces of sheet metal 18 to form the ductwork and easy assembly of the cut pieces of insulation 20 into or onto the ductwork.

The above-described plasma arc cutting process carried out by the plasma arc cutting system can be characterized as a thermal cutting process, because the heat of the plasma arc causes the cutting of the pieces of sheet metal 18. In contrast, the above-described water jet cutting process carried out by the water jet cutting system can be characterized as a nonthermal cutting process, because it is the abrasion of the water jet that causes the cutting of the insulation 20. Any heating associated with the water jet cutting process is relatively insubstantial in comparison to the heat associated with the plasma arc cutting process. Cutting without heat is advantageous when cutting flammable materials, such as some types of insulation 20.

Alternative embodiments of the present invention are substantially like the above-discussed exemplary embodiment, except that the plasma arc cutting system is replaced with another type of thermal cutting system, such as a laser cutting system or a gas torch cutting system, and the water jet cutting system is replaced with another type of nonthermal cutting system. As one example, an alternative nonthermal cutting system can be similar to the above-described water jet cutting system, except that abrasive elements, such as sand, or the like, can be included in the water used by the water jet cutting system. Alternatively, a gas jet cutting system that discharges a gas jet that contains abrasive elements can be used, or the like. In accordance with another alternative embodiment, the drainage conduit 96 is connected to the water supply line 70, or the like, so that the cutting medium used by the nonthermal cutting system is recycled.

Whereas the present invention has been described primarily in the context of cutting sheet metal 18 and sheets of insulation 20, the cutting apparatus 10 can be used to cut a wide variety of other types of workpieces. Accordingly, the scope of the invention is not limited to any particular types of workpieces.

The cutting apparatus 10 of the present invention advantageously incorporates very different thermal and nonthermal cutting processes so that different types of material can be conveniently, efficiently and safely cut with a single cutting apparatus.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for cutting workpieces, comprising:
   a table for supporting the workpieces;
   a gantry mounted for back and forth movement across the table in a first direction;
   a carriage mounted to the gantry for back and forth movement across the table in a transverse direction;
   a first cutting head carried by and movable with the carriage;
   a second cutting head carried by and movable with the carriage;
   a first supply module operatively connected to the first cutting head so that the first cutting head is capable of cutting workpieces via a substantially nonthermal cutting process;
   a second supply module operatively connected to the second cutting head so that the second cutting head is capable of cutting workpieces via a thermal cutting process;
   a controller operative for moving the gantry in the first direction, moving the carriage in the transverse direction, and operating the first cutting head and the second cutting head to cut workpieces positioned on the table;
   a first residue removal system associated with the table and capable of receiving residue from cutting operations performed with the first cutting head; and
   a second residue removal system associated with the table and capable of receiving residue from cutting operations performed with the second cutting head.

2. An apparatus according to claim 1, wherein:
   the table comprises support surface comprising first and second sections that are each for supporting the workpieces;
   the controller is capable of operating the first cutting head while moving the gantry and the carriage so as to move the first cutting head across the first section of the support surface to cut a workpiece supported by the first section of the support surface;
   the controller is capable of operating the second cutting head while moving the gantry and the carriage so as to move the second cutting head across the second section of the support surface to cut a workpiece supported by the second section of the support surface; and
   the controller is operative for:
      restricting operation of the first cutting head while moving the gantry and the carriage so as to move the first cutting head across the second section of the support surface, and
      restricting operation of the second cutting head while moving the gantry and the carriage so as to move the second cutting head across the first section of the support surface.

3. An apparatus according to claim 1, wherein the table comprises a pervious support surface for supporting the workpieces, and both the first and second residue removal systems are at least partially positioned beneath the support surface and operative for receiving the residue from the cutting operations performed with the first and second cutting heads, respectively, through the support surface.

4. An apparatus according to claim 1, wherein:
   the table comprises a pervious support surface comprising first and second sections that are each for supporting the workpieces;
   the controller is capable of operating the first cutting head while moving the gantry and the carriage so as to move the first cutting head across the first section of the support surface to cut a workpiece supported by the first section of the support surface;
   the controller is capable of operating the second cutting head while moving the gantry and the carriage so as to move the second cutting head across the second section of the support surface to cut a workpiece supported by the second section of the support surface;
   the first residual removal system comprises a first container defining at least inlet and outlet openings, wherein the inlet opening is mounted below the first section of the support surface and is capable of receiving through the first section of the support surface residue resulting from operation of the first cutting head while the first cutting head is above the first section of the support surface; and
   the second residual removal system comprises a second container defining at least inlet and outlet openings, wherein the inlet opening of the second container is mounted below the second section of the support surface and is capable of receiving through the second section of the support surface residue resulting from operation of the second cutting head while the second cutting head is above the second section of the support surface.

5. An apparatus according to claim 4, wherein the first and second sections of the support surface are adjacent.

6. An apparatus according to claim 1, wherein:
   the apparatus further comprises a body mounted to the carriage and capable of moving toward and away from the table; and
   the first cutting head and the second cutting head are both carried by and movable with the body.

7. An apparatus for cutting workpieces, comprising:
   a table for supporting the workpieces;

a gantry mounted for back and forth movement across the table in a first direction;

a carriage mounted to the gantry for back and forth movement across the table in a transverse direction;

a water jet cutting head carried by and movable with the carriage;

a plasma arc cutting head carried by and movable with the carriage;

a water supply module operatively connected to the water jet cutting head so that the water jet cutting head is capable of operating to cut workpieces;

a plasma arc supply module operatively connected to the plasma arc cutting head so that the plasma arc cutting head is capable of operating to cut workpieces; and a controller operative for moving the gantry in the first direction, moving the carriage in the transverse direction, and operating the water jet cutting head and the plasma arc cutting head to cut workpieces positioned on the table.

8. An apparatus according to claim 7, further comprising:

a fume removal system associated with the table and capable of drawing and receiving fumes that are generated while the plasma arc cutting head is operated; and a drainage system associated with the table and capable of collecting water that is discharged by the water jet cutting head.

9. An apparatus according to claim 8, wherein the table comprises a support surface for supporting the workpieces, and both the fume removal system and the drainage system are at least partially positioned beneath the support surface.

10. An apparatus according to claim 9, wherein:

the support surface comprises first and second sections;

the controller is capable of operating the water jet cutting head while moving the gantry and the carriage so as to move the water jet cutting head across the first section of the support surface to cut a workpiece supported by the first section of the support surface;

the drainage system is at least partially positioned beneath the first section of the support surface;

the controller is capable of operating the plasma arc cutting head while moving the gantry and the carriage so as to move the plasma arc cutting head across the second section of the support surface to cut a workpiece supported by the second section of the support surface; and the fume removal system is at least partially positioned beneath the second section of the support surface.

11. An apparatus according to claim 7, wherein:

the table comprises a pervious support surface comprising first and second sections that are each for supporting the workpieces;

the controller is capable of operating the water jet cutting head while moving the gantry and the carriage so as to move the water jet cutting head across the first section of the support surface to cut a workpiece supported by the first section of the support surface;

the controller is capable of operating the plasma arc cutting head while moving the gantry and the carriage so as to move the plasma arc cutting head across the second section of the support surface to cut a workpiece supported by the second section of the support surface; and the apparatus further comprises:

a first container defining at least inlet and outlet openings, wherein the inlet opening is mounted below the first section of the support surface and is capable of receiving through the first section of the support surface water that is discharged by the water jet cutting head while the water jet cutting head is operated above the first section of the support surface, and a second container defining at least inlet and outlet openings, wherein the inlet opening of the second container is mounted below the second section of the support surface and is capable of receiving through the second section of the support surface fumes that are generated while the plasma arc cutting head is operated above the second section of the support surface.

12. An apparatus according to claim 11, wherein the first and second sections of the support surface are adjacent.

13. An apparatus according to claim 11, wherein the controller is operative for:

restricting operation of the water jet cutting head while the water jet cutting head is positioned directly above the second section of the support surface; and restricting operation of the plasma arc cutting head while the plasma arc cutting head is positioned directly above the first section of the support surface.

14. An apparatus according to claim 11, wherein the apparatus comprises:

a drainage system that includes the first container and further comprises a passage in communication with the outlet of the first container, wherein the passage is operative for directing water out of and away from the first container; and a downdraft system that includes the second container and further comprises a passage and an air moving device in communication with the outlet of the second container, wherein the air moving device is operative for generating a vacuum in the second container to draw fumes into the second container, and the passage of the downdraft system is operative for directing fumes out of and away from the second container in response to operation of the air moving device.

15. An apparatus according to claim 7, wherein:

the apparatus further comprises a body movably mounted to the carriage and capable of moving toward and away from the table; and the water jet cutting head and the plasma arc cutting head are both carried by and movable with the body.

16. A method of cutting two different workpieces, comprising the steps of:

concurrently carrying both a first cutting head and a second cutting head with a transversely movable carriage that is carried by a movable gantry;

cutting a first workpiece via a nonthermal cutting process with the first cutting head during the concurrently carrying step; and cutting a second workpiece via a thermal cutting process with the second cutting head during the concurrently carrying step.

17. A method according to claim 16, wherein:

the concurrently carrying step comprises concurrently carrying both a water jet cutting head and a plasma arc cutting head with the carriage;

the step of cutting the first workpiece comprises cutting a piece of insulation with the water jet cutting head; and the step of cutting the second workpiece comprises cutting a piece of metal with the plasma arc cutting head.

* * * * *